April 3, 1945.  J. MERCIER  2,372,907
PACKING RING
Filed Sept. 17, 1943
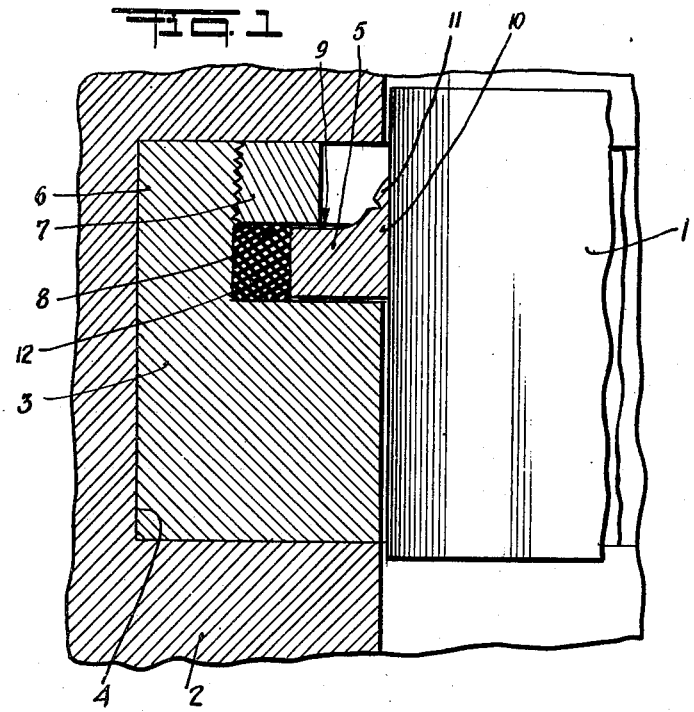
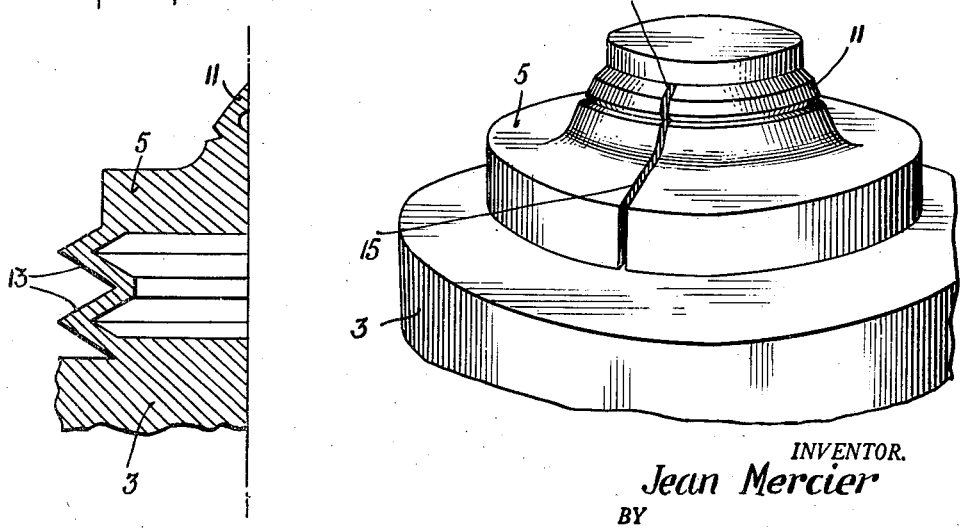
INVENTOR.
Jean Mercier
BY
Howard T. Jeandron
ATTORNEY Patented Apr. 3, 1945

2,372,907

UNITED STATES PATENT OFFICE 2,372,907

PACKING RING

Jean Mercier, New York, N. Y.

Application September 17, 1943, Serial No. 502,732

5 Claims. (Cl. 288—4)

The present invention pertains to packing rings, and more particularly to the type of packing ring described and claimed in my co-pending application, Serial No. 423,391, filed December 17, 1941 and my U. S. Patent No. 2,157,299, issued May 9, 1939.

The packing ring according to Patent 2,157,299 is comprised of a sturdy base portion and an elongated lip portion ending in a scraping edge. Packing rings of that particular type, while very satisfactory due to the efficient seal obtained by the scraping edge and the considerable radial elasticity of the lip portion, have a certain shortcoming, in particular the lip portion has a limited resistance to pressure and, if the device to be sealed is subjected to high pressure, the lip portion is liable to be tightly pressed or forced against the member to be sealed. This causes excessive friction and therefore impairs the efficiency of the seal.

The packing ring according to application 423,391 was devised to overcome or eliminate the aforesaid shortcoming of the elongated gland. For example, the lip portion was reduced in length while its elasticity in the radial direction was maintained at a high value by joining it to the base portion by means of an intermediate portion including an annular groove.

In practice, it has been found that a satisfactory seal cannot be obtained by means of the second mentioned packing ring except with a lip portion of rather limited radial elasticity. This, in turn, requires a careful adjustment of the clearance between the member to be engaged and the base portion of the packing ring to insure a sliding fit having a clearance depending on the diameter of the parts to be sealed and not exceeding in certain cases a few microns. This requires a costly machining of the packing ring and the member to be sealed. In addition, ordinary wear will cause the clearance in comparatively short time to exceed the permissible tolerance and the packing ring will, then, be exposed to accidents owing to injury to the lip portion. Finally, packing rings of that type cannot be used to seal sliding parts, such as parts of an oleo strut of a landing gear for aircraft, in which contamination by sand or or other abrasive foreign matter must be taken into account.

The present invention removes the shortcoming of the previous structures. To that end the packing ring is provided with a base member having an ordinary sliding fit and a lip portion carried by said base portion and rigid with the same in the axial direction while being mounted elastically in the radial direction so as to be capable of displacements in that direction which might exceed the value of the clearance between the base member and the surface to be sealed.

According to a feature of the present invention the packing ring may be split and the break may be sealed by inserting rubber between and secured to the adjacent end faces of the ring.

Further features of the present invention will become apparent from the following description in which an embodiment is given by way of example and illustrated in the accompanying drawing, in which Fig. 1 is a diagrammatic cross sectional view of a packing ring according to the present invention;

Fig. 2 is a cross sectional view of another modification in detail of the packing ring according to Fig. 1;

Fig. 3 is a perspective view of a further modification of the packing ring.

In Fig. 1 the packing ring is shown as applied to seal a piston 1 sliding in a cylinder 2. Annular base portion 3 is carried in a recessed portion 4 of cylinder 2. An independent lip portion 5 is mounted on base portion 3 by means of a projection 6 integral with said base portion and an insert 7 threadably secured to projection 6. Insert 7 is screwed down to a sliding contact between its face 8 and the face 9 of said lip portion 5.

By virtue of this structure lip portion 5 remains free to move in the radial direction and can yield as may be required by uneven portions in the piston's surface.

A conventional seal 12 is provided between lip portion 5 and base portion 3 which may be of the type disclosed in my copending application Serial No. 498,862, filed August 16, 1943.

In Fig. 1 the clearance between base portion 3 and piston 1 as well as the distance between lip portion 5 and projection 6 are shown enlarged out of proportion with the other dimensions to emphasize the structure which permits a radial displacement of lip portion 5 over a distance exceeding the normal clearance between the base portion and the surface to be sealed.

The head 10 of said lip portion includes a scraping edge 11 and may have the structure of the packing ring disclosed in my above mentioned application 423,391, filed December 17, 1941.

Fig. 2 illustrates a different way of mounting lip portion 5 to base portion 3. The former is, in this case, directly mounted on the latter by means of a bellows-shaped bracket 13. The advantage of this structure is that seal 12 can be dispensed with. However, bracket 13 must combine sufficient rigidity to avoid deformation by the fluid pressure prevailing in the device to be sealed with the required elasticity to permit of radial displacement of portion 5 exceeding the clearance between portion 3 and the surface to be sealed. In consequence, this manner of mounting can be used only in cases where the fluid pressure does not vary in pressure except over a very limited range.

Fig. 3 shows a packing ring including a break 14 in lip portion 3. A rubber band 15 is inserted into break 14 and permanently secured as, for instance, by bonding, to the adjacent end faces of the packing ring. The mounting of lip portion 5 on base portion 3 may be effected in this case either in the manner shown in Fig. 1 or in that according to Fig. 2. If the mounting according to Fig. 2 is used bracket 13 must also be split and a seal similar to band 15 must be inserted into the break. If a mounting according to Fig. 1 is used, then projection 6 and bracket 7 do not require a similar break.

Packing rings according to Figs. 1 and 2 will give satisfactory service in cases where the clearance between base portion 3 and the surface to be sealed exceeds five or six microns and will prevent injury to the lip portion even if the member to be engaged by the same is subjected to considerable lateral stresses.

If, however, the presence of foreign substances as, for instance, sand or other abrasives in the fluid has to be taken into account, then the use of a packing ring according to Fig. 3 is preferable.

The foregoing description is not intended to limit the present invention which extends to all changes, modifications and equivalents within the scope of the appended claims.

What is claimed is:

1. A one piece packing ring which comprises a base portion having a sliding fit with the surface to be sealed, a lip portion that is an integral part of said base portion and having a scraping edge adapted to engage said surface, said lip portion being mounted to said base portion so as to be rigid with the same in the axial direction and to be capable of radial displacements with respect thereto exceeding in distance the clearance between said base portion and said surface to be sealed.

2. Packing ring which comprises an annular base portion having a sliding fit with the surface to be sealed, an axial projection rigid with said base portion at a distance from said surface, an annular bracket secured to said projection and extending toward said surface, an annular lip portion clampingly secured by said bracket to said base portion, said lip portion including a circular scraping edge engaging said surface, an annular chamber formed by the walls of said base portion, said projection and said bracket behind the end face of said lip portion opposite said scraping edge, said lip portion having a sliding fit with said base portion and said bracket, the length of said chamber in the radial direction exceeding the clearance between said base portion and said surface, and means to seal the clearance between said base portion and said lip portion.

3. Packing ring according to claim 2 in which said lip portion is split so as to permit of alternating extensions and contractions in the radial direction, an elastic material being inserted into the break and being intimately secured to the two opposing faces of said lip portion.

4. Packing ring which comprises an annular base portion having a sliding fit with the surface to be sealed, a lip portion including a scraping edge engaging said surface, said lip portion being joined to said base portion by an intermediate portion having the shape of an inverted V, said intermediate portion forming an annular chamber with said lip portion and said base portion, said intermediate portion being adapted over a limited range of pressure to resist axial displacements of said lip portion while allowing radial displacements thereof exceeding in distance the clearance between said base portion and said surface.

5. Packing ring according to claim 4 in which said lip and intermediate portions are split so as to permit of alternating extensions and contractions in the radial direction, an elastic material being inserted into the break and being intimately secured to the two opposing faces of said lip and intermediate portions.

JEAN MERCIER.